3,412,060
METHOD OF PREPARING AQUEOUS SOLUTIONS OF ACRYLAMIDE POLYMERS WITH DIMETHYL SULFOXIDE
Amir M. Sarem, Yorba Linda, Calif., assignor to Union Oil Company of California, Los Angeles, Calif., a corporation of California
No Drawing. Filed Dec. 13, 1965, Ser. No. 513,571
20 Claims. (Cl. 260—29.6)

ABSTRACT OF THE DISCLOSURE

Difficultly water soluble solid polymers which are insoluble in dimethyl sulfoxide can be rendered readily water soluble by contacting the solid polymer with liquid dimethyl sulfoxide prior to dissolution in aqueous solvent. The invention includes a composition comprising minor proportions of water soluble acrylamide polymer and dimethyl sulfoxide in aqueous solution.

---

This invention relates to a method of preparing superior aqueous solutions of water soluble polymers, and more particularly, to an improved method of dissolving high molecular weight water soluble polymers in aqueous media. In another aspect, this invention relates to aqueous polymer compositions having improved properties.

Various water soluble polymers have been developed which in aqueous solution exhibit superior thickening and flocculating properties. These polymers are being increasingly used in a number of commercial applications, such as for example in the clarification of aqueous solutions of uranium salts, in sizing paper and textiles, in the treatment of sewage and industrial wastes, as stabilizers for drilling muds, and in the secondary recovery of petroleum by water flooding. While various natural water soluble polymers and gums have long been used, some of the more recently developed synthetic polymers are desirable because of their greater uniformity and further because substantial thickening can be achieved at relatively low polymer concentrations.

Although these polymers are most often available commercially as powders, or otherwise in finely divided solid form, they are usually most advantageously utilized in aqueous solution. Accordingly, the solid polymer material must be dissolved in water. Although the various polymers are more or less soluble in water, difficulty is often experienced in preparing aqueous polymer solutions because of the slow dissolution rate of many of these polymers and because the solid polymer is not readily dispersible in water.

Dispersion of solid polymer in water is hindered by the tendency of the solid to cake on contact with water. Lumps of solid material are formed by the encapsulation of undissolved solid in an outer coating of water wet polymer which retards the penetration of additional water into the agglomerate. Although many of these lumps are finally dissolved by continued agitation, it is frequently impractical to agitate the solution for a sufficiently long period to obtain complete dissolution. In many applications, such as water flooding for example, solids cannot be tolerated. Thus, the residual polymer solids must be removed by a separate filtration step. Not only does poor dispersion of the polymer result in the necessity of the additional filtration step and waste of the undissolved polymer, but also the final solution is less beneficially treated.

Heretofore various dispersion apparatus have been proposed to effect dissolution of the solid polymer. Several of these devices function by creating a vortex into which the polymer solid is added in sufficiently small quantities that dispersion is substantially effected without agglogeration or lumping. However, even with the best of such devices, dissolution of the polymer is time consuming and a certain amount of agglomeration occurs, thus necessitating additional filtration to assure a solids-free aqueous polymer solution.

Most aqueous solutions of these polymers are non-Newtonian liquids exhibiting pseudo plastic flow under conditions of shear. Because of this characteristic, certain of these polymers such as the polyacrylamides have been adapted to thickening of aqueous liquids employed in various well stimulation and secondary recovery processes. The viscosity of an aqueous solution containing a given quantity of polyacrylamide is a function of the molecular weight of the polymer. When these polymers are dissolved in water, the apparent viscosity of the solution is sharply increased, even in rather dilute solution. However, the apparent viscosity decreases with time, particularly at elevated temperatures. Thus, the solution, on storage or upon use such as injection into a subterranean earth formation, suffers reduced viscosity and loss of the beneficial effect of the polymer. The exact mechanism within the polymer molecule itself or within the aqueous solution of the polymer is not completely understood but it is believed that the viscosity degradation is due, at least in part, to a breaking up of the exceedingly long polymeric chains. Although the stability of these viscous polymer solutions can be improved by the addition of various ketones, alcohols, glycols, or glycol ether esters, these stabilizing agents are also solvents which generally impart reduced initial viscosity to the polymer solution. Thus, even though stability is improved, the initial beneficial effect of the polymer is reduced.

Accordingly, it is an object of the present invention to provide an improved method of effecting dissolution of a water soluble polymer in water. Another object is to provide a method of enhancing the beneficial effect imparted to water by dissolved water soluble polymers. Still another object of the invention is to provide a method of preparing an aqueous polyacrylamide solution having increased stability. A further object is to provide a composition useful in the secondary recovery of petroleum. Other objects and advantages of the invention will be apparent to those skilled in the art from the description thereof which follows.

Various particulated solid polymers are rendered readily soluble in aqueous liquids according to the method of this invention by treating the solid polymer with liquid dimethyl sulfoxide prior to admixing the polymer into the aqueous medium. The difficulty soluble solid polymer is solubilized by an adherent coating of liquid dimethyl sulfoxide. Thus, the solubilizing treatment can be effected by merely premixing the polymer solid with a small quantity of liquid dimethyl sulfoxide sufficient in quantity to wet the solid polymer material. For most purposes the dimethyl sulfoxide will not adversely affect the resulting aqueous polymer solution, particularly in the small amounts required for solubilization of the polymer. Further, certain properties of these solutions, such as viscosity stability, are enhanced by the added dimethyl sulfoxide. Therefore, it is frequently desirable to add an excess of dimethyl sulfoxide over that required to solubilize the solid in order that the final aqueous polymer solution will be further benefited. It has also been found that the beneficial effect of dimethyl sulfoxide in increasing the viscosity stability of these solutions is further enhanced by the addition of minor amounts of alkali metal bicarbonates and carbonates.

The solubilizing technique of this invention is applicable to the preparation of aqueous solutions of any of a variety of solid, water soluble polymers which as insoluble in liquid dimethyl sulfoxide. While this method can be employed to prepare aqueous solutions of any water soluble polymer, it is directed to the preparation of aqueous solutions of those water soluble polymers which are difficultly dispersible in aqueous media. Among the various water soluble polymers rendered more readily dispersible by treatment with dimethyl sulfoxide are both those of natural and synthetic origin. Generally, dimethyl sulfoxide will improve the water solubility of polymers having molecular weights of from about 30,000 up to 40,000,000 or more. Since the difficulty of dissolving these materials increases with the molecular weight of the polymer, dimethyl sulfoxide usually exhibits greater beneficial effect with the higher molecular weight polymers.

One class of water soluble polymer to which the solubilizing technique of this invention is particularly suited is a solid acrylamide polymer having a molecular weight in excess of about 30,000. The terms "acrylamide polymer" and "polyacrylamide", as employed herein, are inclusive of the hydrolyzed and partially hydrolyzed polyacrylamides having all or a portion of the carboxamide groups hydrolyzed to carboxyl groups, and of the modified polymers wherein the carboxyl groups are in the acid form and also of such polymers wherein the carboxyl groups are in the salt form, provided that the salts are water soluble. Thus, for example, the polyacrylamide can be employed in the form of sodium, potassium, or other alkali metal salts, the ammonium salt or mixed salts of sodium, potassium, and the like. Salts of polyvalent ions, such as iron and aluminum, are to be avoided for reaons of insolubility. The terms "acrylamide polymer" and "polyacrylamide" as employed herein, are also inclusive of homopolymers of acrylamide or copolymers thereof with other suitable polymerizable compounds such as vinyl acetate, acrylonitrile, methacrylonitrile, vinyl alkyl ethers, vinyl chloride, and the like, provided that the copolymers so employed are characterized by water solubility.

The foregoing polymeric solids can be readily dissolved in water or other aqueous media by first treating these solids with dimethyl sulfoxide in sufficient quantity to provide a coating of the treating liquid on the individual solid particles. This coating of adherent dimethyl sulfoxide substantially prevents agglomeration of the polymer lumps frequently formed on adding the polymer solid directly to the aqueous solvent. Usually difficultly soluble polymers are readily dissolved with a minimum of agitation or mixing and without the aid of complicated mixing apparatus. Further, the polymer solid is completely dissolved in the aqueous solvent thereby avoiding filtration of the aqueous polymer solution commonly required.

Solubilization is achieved by first contacting the particulated, solid polymer substance with liquid dimethyl sulfoxide. The contacting step can be accomplished in any convenient manner, such as by passing the solid polymer through a body of liquid dimethyl sulfoxide, by spraying the liquid onto the solids, etc. Excess dimethyl sulfoxide can be removed by simply allowing liquid to drain from the solid particles, thereby leaving the particles coated with a thin film of adherent liquid. Alternatively, the polymer solution is simply prepared by first mixing the polymer solid with at least sufficient liquid dimethyl sulfoxide to coat the solid particles with adherent liquid, and then admixing this mixture of solid polymer particles and liquid dimethyl sulfoxide with aqueous solvent. Whichever contacting method is employed, the solid particles are easily coated with liquid dimethyl sulfoxide without being dissolved therein, since the polymers to which this invention is directed are substantially insoluble in dimethyl sulfoxide.

The technique of this invention is most effectively employed with granulated, powdered or otherwise finely divided solid polymer. Therefore, it is desirable to subject solid or large particle-size material to a conventional size reduction step prior to admixture with dimethyl sulfoxide. However, most commercial acrylamide polymers are available in granular or powdered form and further size reduction is usually unnecessary.

Although coating of the polymer particles sufficiently to render them readily soluble in a aqueous solvent can usually be accomplished with as little as 0.1 part by weight of dimethyl sulfoxide per part of polymer, the properties of the resulting aqueous polymer solution are enhanced by the use of sufficient dimethyl sulfoxide to beneficially affect the solution.

The addition of relatively small proportions of dimethyl sulfoxide to aqueous solutions of acrylamide polymer results in stabilization of the solution as evidenced by a decrease in the magnitude of the viscosity reduction on aging. Stabilization of these solutions is generally obtainable by the addition of dimethyl sulfoxide in an amount equivalent to not more than 5 weight percent of the aqueous solution, and usually in amounts of 1 weight percent or less, although higher addition rates may be necessitated with specific solutions. Many aqueous acrylamide solutions exhibit viscosity stabilization at dimethyl sulfoxide concentrations of 0.2 weight percent, or less, with substantially no additional stability evidenced at higher additive concentrations.

Although dimethyl sulfoxide has a viscosity of only 1.98 centipoise at 25° C., it does not appreciably reduce the initial viscosity of aqueous polymer solutions to which it has been added in minor amounts as do many of the prior art stabilizers. In fact, the initial viscosity of the aqueous solution is frequently beneficially affected by the addition of dimethyl sulfoxide so that a given quantity of polymer imparts an increased initial viscosity to an aqueous solvent.

While the foregoing method of solubilizing difficultly dispersible water soluble polymers can be used in preparing aqueous polymer solutions useful in a variety of applications, the method of this invention has particular application in the preparation of aqueous acrylamide solutions useful in the secondary recovery of petroleum by water flooding, hydraulic fracturing, and similar techniques wherein viscous water is injected through a well and into contact with a subterranean formation penetrated by the well. Not only can the aqueous acrylamide solution be easily prepared at the well site by first treating the solid particulated polymer with dimethyl sulfoxide, but also the dimethyl sulfoxide renders the resulting aqueous solution less susceptible to viscosity degradation on injection of the solution into the formation at the usual elevated temperature encountered, i.e., at temperatures of up to 200° F., or higher.

Compositions useful in the secondary recovery of petroleum and for other purposes comprise aqueous solutions containing minor proportions of acrylamide polymer and dimethyl sulfoxide, and particularly wherein the dimethyl sulfoxide is in the proportion of about 0.1 to about 100 parts by weight of dimethyl sulfoxide per part of acrylamide polymer. Satisfactory thickening of the aqueous solvent is usually obtainable with 1 weight percent, or less, of polymer and frequently with polymer contents of 0.1 weight percent, or less. A particularly preferred water flooding composition is an aqueous solution containing between about 0.001 and about 1.0 weight percent of acrylamide polymer and dimethyl sulfoxide in the proportion of about 0.1 to about 100 parts by weight of dimethyl sulfoxide per part of acrylamide polymer. In secondary recovery applications, it is usually unnecessary and undesirable for the total additive content, i.e., the combined amount of polymer and dimethyl sulfoxide, to exceed 5 percent by weight of the aqueous solution.

Particular acrylamide polymers known to possess advantageous properties for preparing viscous aqueous compositions for use in the secondary recovery of petroleum and which can be solubilized by the method of this invention are high molecular weight hydrolyzed polyacrylamides having from about 12 to about 67, and preferably from about 12 to about 45 mole percent of the original carboxamide groups hydrolyzed to carboxyl groups, including modified polymers wherein the carboxyl groups are in the acid form and also wherein the carboxyl groups are in the form of water soluble salts.

These preferred hydrolyzed polyacrylamides are characterized by a molecular weight of at least 500,000 and molecular weights of 1,000,000 or more are preferred. The viscosity of a standard solution of polymer under controlled conditions is correlated with the molecular weight of the polymer. Accordingly, it has been found that the hydrolyzed polyacrylamides suitable for use in the invention are those characterized by a viscosity of at least 6 centipoises for a 0.5 percent by weight solution thereof in aqueous 4 percent by weight sodium chloride solution at a temperature of 25° C. as determined with an Ostwald viscosimeter.

The viscosity stability of the foregoing compositions can be improved by including a minor amount of alkali metal bicarbonate or carbonate in the aqueous solution, and particularly an amount between about .001 and about 0.1 percent by weight of the final solution. The bicarbonates and carbonates of lithium, sodium, potassium, rubidium and cesium are useful in promoting improved viscosity stability to these solutions. The synergistic effect of these salts in combination with dimethyl sulfoxide is unexpected since alkali metal bicarbonates and carbonates adversely affect both the initial and aged viscosities of aqueous polyacrylamide solutions in the absence of dimethyl sulfoxide. Solutions containing alkali metal bicarbonates and carbonates can be prepared by simply dissolving an appropriate quantity of a selected compound in the viscous solution containing dissolved polyacrylamide, or alternatively, the viscous acrylamide solution can be prepared from aqueous solvent containing the appropriate concentration of alkali metal bicarbonate or carbonate.

The following examples are illustrative of various modes of practicing this invention, but are not to be construed as limitations thereof:

Example I

The solubilizing effect of dimethyl sulfoxide on high molecular weight acrylamide polymer is demonstrated by dissolving solid polymer in water both with and without pretreatment with dimethyl sulfoxide. The acrylamide polymer is a partially hydrolyzed commercial polyacrylamide marketed by the Dow Chemical Company under the trade designation ET-601.

A first aqueous polymer solution is prepared by adding 0.2 gm. of ET-601 powder to 200 ml. of water at room temperature and vigorously agitating for 30 seconds. The solution is allowed to stand for 5 minutes and then visually observed.

A second aqueous polymer solution is prepared according to the method of this invention. A mixture of 0.2 gm. of ET-601 powder and 0.4 gm. liquid dimethyl sulfoxide is prepared by simply pouring the liquid over the acrylamide powder. This mixture is then added to 200 ml. of water at room temperature and vigorously agitated for 30 seconds. Again the solution is allowed to stand for 5 minutes and visually observed.

After 5 minutes, numerous visible lumps of agglomerated polymer powder remain in the first polymer solution. In contrast, the second polymer solution prepared by pre- mixing the polymer with dimethyl sulfoxide appears clear with no visible undissolved solid matter being apparent. Also, the second polymer solution containing the dimethyl sulfoxide qualitatively exhibits a higher initial viscosity than did the first solution.

Example II

The effect of dimethyl sulfoxide on the stability of an aqueous solution of polyacrylamide is demonstrated by determining the initial and aged viscosities of solutions both with and without dimethyl sulfoxide.

A first solution of polyacrylamide is prepared by dissolving 3 parts by weight of Dow Chemical Company ET-601 polyacrylamide powder in 9,997 parts by weight of water. Dissolution of the polyacrylamide is obtained by careful control of the solid addition rate and continued agitation until suspended solids are no longer visible. A second aqueous polyacrylamide solution is prepared according to the method of this invention by first admixing 3 parts by weight of ET-601 powder and 20 parts by weight of dimethyl sulfoxide. This mixture is then dissolved in 9,977 parts by weight of water.

The initial viscosity of each solution is determined with a conventional Brookfield viscosimeter at speeds of 3, 6, 12, 30 and 60 r.p.m. using a U.L. Adapter. Each solution is then stored for 7 days at 200° F. under a helium blanket. The viscosity determinations are repeated on the aged samples. Results obtained on the various samples are summarized in Table A.

TABLE A.—EFFECT OF DIMETHYL SULFOXIDE ON VISCOSITY STABILITY OF 0.03 WEIGHT PERCENT AQUEOUS POLYMER SOLUTION

| Sample | DMSO, weight percent | Age, Days | Viscosity, cp. at 75° F. and r.p.m. of— | | | | |
|---|---|---|---|---|---|---|---|
| | | | 3 | 6 | 12 | 30 | 60 |
| 1 | 0 | 0 | 27.2 | 20.8 | 15.85 | 10.84 | 8.2 |
| | | 7 | 3.4 | 3.0 | 2.7 | 2.3 | 2.31 |
| 2 | 0.20 | 0 | 28.0 | 21.6 | 16.35 | 11.38 | 8.64 |
| | | 7 | 5.0 | 4.2 | 3.7 | 3.32 | 3.24 |

The effect of aging on the viscosity increasing property of the polyacrylamide is demonstrated by the viscosity degradation experienced with sample number 1 after seven days' storage at the elevated temperature. Not only is the acrylamide polymer rendered readily soluble by admixture with dimethyl sulfoxide, but the stability of the aqueous polyacrylamide solution is enhanced without the usual loss of initial viscosity obtained with conventional stabilizing agents. Also, the initial or fresh viscosity of sample number 2 is slightly higher than that observed for sample number 1 prepared in conventional manner.

Example III

The effect of alkali metal bicarbonate in promoting stabilization of aqueous polyacrylamide by dimethyl sulfoxide is demonstrated by the following series of tests.

A solution containing 0.03 weight percent polyacrylamide is prepared by dissolving 3 parts by weight of Dow Chemical Company ET-601 polyacrylamide in 9,997 parts by weight of distilled water. A second solution is prepared by dissolving 3 parts by weight of ET-601 in 9,997 parts by weight of 0.014 weight percent aqueous sodium bicarbonate solution. Dissolution of the polyacrylamide powder is effected by careful control of the solid addition rate and by continued agitation.

Additional polyacrylamide solutions are prepared according to the method of this invention by first preparing mixtures of 3 parts by weight of ET-601 with varying quantities of liquid dimethyl sulfoxide, i.e., with 20, 100 and 500 parts by weight of dimethyl sulfoxide. These mixtures are each then admixed with sufficient 0.014 weight percent sodium bicarbonate solution to yield 10,000 parts of aqueous polymer solution.

The initial viscosity of each of these solutions is determined with a conventional Brookfield viscosimeter at speeds of 3, 6, 12, 30 and 60 r.p.m. using a U.L. Adapter.

The solutions are then aged under a helium blanket for 7 days at a temperature of 200° F. and the viscosities of the aged samples determined. Results obtained on the various samples are summarized in Table B.

TABLE B.—EFFECT OF SODIUM BICARBONATE IN PROMOTING THE STABILIZATION OF AQUEOUS SOLUTIONS OF POLYARCRYLAMIDE

| Sample | DMSO, weight percent | NaHCO$_3$,[1] weight percent | Age, days | Viscosity, cp. at 75° F. and r.p.m. of — | | | | |
|---|---|---|---|---|---|---|---|---|
| | | | | 3 | 6 | 12 | 30 | 60 |
| 1 | 0 | 0 | 0 | 27.2 | 20.8 | 15.85 | 10.84 | 8.2 |
| | | | 7 | 3.4 | 3.0 | 2.7 | 2.3 | 2.31 |
| 2 | 0 | 0.014 | 0 | 15.4 | 12.7 | 10.5 | 7.74 | 6.24 |
| | | | 7 | 2.4 | 1.7 | 1.65 | 1.46 | 1.41 |
| 3 | 0.2 | 0 | 0 | 28.0 | 21.6 | 16.35 | 11.38 | 8.64 |
| | | | 7 | 5.0 | 4.2 | 3.7 | 3.32 | 3.24 |
| 4 | 0.2 | 0.014 | 0 | 14.6 | 12.2 | 10.1 | 7.48 | 6.03 |
| | | | 7 | 7.2 | 4.6 | 4.0 | 3.76 | 3.51 |
| 5 | 1.0 | 0.014 | 0 | 14.8 | 12.3 | 10.15 | 7.60 | 6.10 |
| | | | 7 | 5.8 | 5.3 | 4.7 | 4.26 | 3.96 |
| 6 | 5.0 | 0.014 | 0 | 14.6 | 12.2 | 10.0 | 7.52 | 6.06 |
| | | | 7 | 6.8 | 5.4 | 4.8 | 4.32 | 4.00 |

[1] NaCHO$_3$ concentration expressed in percentage by weight of the water content.

The detrimental effect of the sodium cation in reducing the viscosity increase afforded by the polyacrylamide is illustrated by comparison of the viscosity results obtained on sample Nos. 1 and 2, both fresh and after aging. In all cases, the sodium bicarbonate caused reduced viscosities. However, a contrary result is obtained when the aqueous polyacrylamide solution is prepared with dimethyl sulfoxide according to the method of this invention. Solution Nos. 4, 5 and 6 all show aged viscosities superior to solution No. 3 prepared with dimethyl sulfoxide and distilled water, or to solution Nos. 1 and 2 prepared by conventional techniques.

While particular embodiments of the invention have been described, it will be understood, of course, that the invention is not limited thereto since many modifications can be made, and it is intended to include within the invention any such modifications as fall within the spirit and scope of the claims.

The invention having thus been described, I claim:

1. A method of preparing aqueous solutions of water solution polymer which comprises:
    treating solid particles of an acrylamide polymer having a molecular weight in excess of about 30,000 with liquid dimethyl sulfoxide, and
    admixing said treated polymer solids with an aqueous liquid.

2. The method defined in claim 1 wherein said polymer is treated by admixing said solid particles with liquid dimethyl sulfoxide.

3. The method defined in claim 2 wherein excess dimethyl sulfoxide is removed from said solid polymer particles so as to impart an adherent liquid coating to said solid particles.

4. The method defined in claim 2 wherein said solid polymer particles are admixed with only sufficient of said liquid to just coat said particles.

5. The method defined in claim 2 wherein said solid polymer particles are admixed with said liquid dimethyl sulfoxide in the proportion of about 0.1 to about 100 parts by weight of dimethyl sulfoxide per part of polymer.

6. The method defined in claim 1 wherein said acrylamide polymer is a partially hydrolyzed polyacrylamide.

7. The method defined in claim 1 wherein said acrylamide polymer is a partially hydrolyzed polyacrylamide having from 12 to 67 percent of the original carboxamide groups hydrolyzed to carboxyl groups.

8. The method of claim 7 wherein said partially hydrolyzed polyacrylamide has a molecular weight of at least 500,000 and is characterized by a viscosity of at least 6 centipoises for a 0.5 percent by weight solution thereof in an aqueous 4 percent by weight sodium chloride solution at a temperature of 25° C. as determined with an Ostwald viscosimeter.

9. The method defined in claim 1 wherein said aqueous liquid is water.

10. The method defined in claim 1 including the step of adding a salt selected from the group consisting of alkali metal bicarbonates and alkali metal carbonates to said aqueous solution.

11. The method defined in claim 10 wherein said salt is sodium bicarbonate.

12. The method defined in claim 10 wherein said salt is potassium bicarbonate.

13. A method of dissolving a particulated, solid water soluble polymer in an aqueous liquid, which comprises:
    coating a particulated solid acrylamide polymer or a copolymer of acrylamide and an ethylenically unsaturated monomer having a molecular weight in excess of about 30,000 with liquid dimethyl sulfoxide; and
    admixing said coated particulated solid with said aqueous liquid.

14. A composition comprising an aqueous solution containing a water soluble acrylamide polymer having a molecular weight in excess of about 30,000 and about 0.1 to about 100 parts of dimethyl sulfoxide per part of said acrylamide polymer.

15. The composition defined in claim 14 wherein said water soluble polymer content of said solution is within the range of from about 0.001 to about 1.0 percent by weight.

16. The composition defined in claim 14 wherein said acrylamide polymer is a partially hydrolyzed polyacrylamide having from 12 to 67 percent of the original carboxamide groups hydrolyzed to carboxyl groups.

17. The composition defined in claim 16 wherein said partially hydrolyzed polyacrylamide has a molecular weight of at least 500,000 and is characterized by a viscosity of at least 6 centipoises for a 0.5 percent by weight solution thereof in an aqueous 4 percent by weight sodium chloride solution at a temperature of 25° C. as determined with an Ostwald viscosimeter.

18. The composition defined in claim 14 also including a minor proportion of a salt selected from the group comprising alkali metal bicarbonates and alkali metal carbonates.

19. The composition defined in claim 18 wherein said salt is sodium bicarbonate.

20. The composition defined in claim 18 wherein said salt is potassium bicarbonate.

References Cited
UNITED STATES PATENTS 3,080,350   3/1963   Imai et al. _____ 260—89.1

MURRAY TILLMAN, *Primary Examiner.*

W. J. BRIGGS, SR., *Assistant Examiner.*